United States Patent
Grob (12) 
(10) Patent No.: US 6,338,415 B1
(45) Date of Patent: Jan. 15, 2002

(54) HANDLED PLASTIC CONTAINER

(75) Inventor: Rolf Grob, Victoria (AU)

(73) Assignee: Continental PET Technologies, Inc., Florence, KY (US)

( * ) Notice: Subject to any disclaimer, the term of this patent is extended or adjusted under 35 U.S.C. 154(b) by 0 days.

(21) Appl. No.: 09/685,353

(22) Filed: Oct. 10, 2000

Related U.S. Application Data (60) Division of application No. 09/422,822, filed on Oct. 21, 1999, now Pat. No. 6,179,143, which is a continuation of application No. 08/836,458, filed on May 14, 1997, now abandoned, and a continuation of application No. PCT/AU95/00751, filed on Nov. 14, 1995.

(30) Foreign Application Priority Data

Nov. 15, 1994 (AU) .............................................. PM9417

(51) Int. Cl.$^7$ .............................................. B65D 25/28
(52) U.S. Cl. ...................... 215/398; 220/767; 220/770; 220/771
(58) Field of Search ............................... 215/396, 398; 220/767, 770, 771

(56) References Cited

U.S. PATENT DOCUMENTS

| | | | | |
|---|---|---|---|---|
| 4,273,246 A | * | 6/1981 | Thompson | 215/398 |
| 4,368,826 A | * | 1/1983 | Thompson | 215/398 |
| 6,179,143 B1 | * | 1/2001 | Grob | 220/771 |

FOREIGN PATENT DOCUMENTS

| | | | |
|---|---|---|---|
| JP | 56-64948 | * | 6/1981 |

* cited by examiner

*Primary Examiner*—Stephen Castellano
(74) *Attorney, Agent, or Firm*—Finnegan, Henderson, Farabow, Garrett & Dunner, L.L.P.

(57) ABSTRACT

A method of manufacturing a handled plastic container which includes the steps of: a) positioning a preformed handle and a synthetic resin preform within an open blow mold without mutual engagement of said handle and preform; said handle including upper retaining means and lower retaining means and said preform including a molded engagement portion adapted to engage with the upper retaining means of the handle; b) causing the upper retaining means of the handle to interconnect with the engagement portion of the preform after the handle and preform have been separately positioned within the blow mold; and c) stretch blow molding the preform in the blow mold wherein said blow molding stretches the preform beneath the engagement portion into blow mold to form a container and expands the sidewall of the preform so as to retain the upper retaining means of the handle in interconnecting relation with the engagement portion of the preform. In another aspect of the invention there is provided a handled plastic container, said container comprising a low molded plastic bottle and a separate handle interconnected thereto wherein the handle includes upper retaining means and lower retaining means, said upper retaining means including a lug or protrusion, and the bottle including a neck finish having an engagement portion co-operate with said lug or protrusion connecting said upper retaining means with said bottle, and wherein the lower retaining means in integrated with a portion of a sidewall of the bottle.

14 Claims, 6 Drawing Sheets

HANDLED PLASTIC CONTAINER

RELATED APPLICATIONS

This application is a continuation of U.S. patent application Ser. No. 09/422,822 now U.S. Pat. No. 6,179,143, filed Oct. 21, 1999, which is a continuation of U.S. patent application Ser. No. 08/836,458 filed May 14, 1997, now abandonded which is CIP application of Australian patent application no. PCT/AU95/00751 filed Nov. 14, 1995.

BACKGROUND OF THE INVENTION

This invention relates to a handled plastic container in which the container is formed by blow moulding a preform and the handle is separately formed and then connected to the container during the container forming process.

Plastic containers for holding liquids including beverages and other domestic liquids are in wide spread use. During the 1980's plastic largely replaced glass as the material of first preference for the packaging of carbonated soft drinks. Plastics such as polyethylene terephthalate (PET) offer significant savings when compared with glass in packaging such products. Plastic is lighter than glass and plastic bottles are cheaper to make and cheaper to transport than glass bottles. In addition, there are clear safety advantages when using plastic given the inherent problems with breakages when using glass. Plastic containers are also in wide use for products such as detergents and fruit juices. Such products are generally packaged in one or two litre containers with relatively large outlet openings. For ease of pouring, containers such as those made from PVC often include a handle. In the past, the handle in plastic containers formed by extrusion blow moulding have been provided by blow moulding a hollow and integral handle portion into the container side wall. Given the constraints of container design, such handles are generally quite broad and often leave little room for one to firmly grasp the inside of the handle. Special moulds are required in the production of such bottles, they are more difficult to blow mould than a non handled bottle and there are difficulties with stress concentrations leading to possible container failure in the areas near the junction of the handle with the rest of the container.

In addition, it has not been generally possible to economically produce such handled bottles from synthetic polyesters such as PET. To extrusion blow mould PET it would be necessary to use a resin having a high intrinsic viscosity (i.e. well over 1.0). Such containers would not have the same degree of side wall orientation as a container stretch blow moulded from a preform. If an integral handle was formed in a PET container formed from a preform, special cutting tooling would be required to remove the flashing formed between the container side wall and the integrally formed handle due to the high orientation of the material.

An alternative is the use of a separate handle joined to the container. If a separate handle is utilised it is possible to injection mould a handle which is narrower and thinner than the integral handles of the previously described blow moulded containers and if adequately attached to the container such handle designs are more effective and easier to use.

Various attempts have been made to attach separate handles to blow moulded containers formed from preforms but these have not been altogether successful. One difficulty has been inadequate engagement of the handle with the blow moulded container. A further difficulty has been the relative slowness of the processes used to produce such containers.

It is an object of the present invention to provide a method of securing a separate handle to a plastic blow moulded container which enables relatively rapid manufacture and which leads to the production of a handled bottle where the handle is firmly secured.

SUMMARY OF THE INVENTION

In accordance with the present invention, the applicants have developed a modified preform having a moulded engagement portion adapted to engage with part of a separately formed handle. In the past, it has been proposed that such handles be connected to the plastic container by blow moulding the walls of the container around retaining portions provided at the respective ends of the handle. For example, reference is made to Australian patent 637,696. The present invention provides for engagement of at least part of the handle with an engagement portion which is preferably rigid and which is not subject to stretching during the blow moulding process.

Thus, in accordance with one aspect of the present invention there is provided a method of manufacturing a handled plastic container which includes the steps of:

(a) positioning a preformed handle and a synthetic resin preform within an open blow mould without mutual engagement of said handle and preform; said handle including upper retaining means and lower retaining means and said preform including a moulded engagement portion adapted to engage with the upper retaining means of the handle;

(b) causing the upper retaining means of the handle to interconnect with the engagement portion of the preform after the handle and preform have been separately positioned within the blow mould; and (c) stretch blow moulding the preform in the blow mould wherein said blow moulding stretches the preform beneath the engagement portion into the blow mould to form a container and expands the side wall of the preform so to retain the upper retaining means of the handle in interconnecting relation with the engagement portion of the preform and so to secure and integrate the lower retaining means of the handle within the body of the formed container.

In another aspect of the invention there is provided a method of manufacturing a handled plastic container which includes the steps of:

a) positioning a preformed handle and a synthetic resin preform within an open blow-mould without mutual engagement of said handle and preform; said handle having an upper retaining means in an upper portion of said handle and a free end and said preform including a moulded engagement portion adapted to engage with said upper retaining means of the handle;

b) causing the upper retaining means to interconnect with the engagement portion of the preform after the handle and the preform have been separately positioned within the blow mould; and c) stretch blow moulding the preform in the blow mould wherein the said blow moulding stretches the preform beneath the engagement portion into the blow mould to form a container and expands the side wall of the preform so to retain the upper retaining means of the handle in interconnecting relation with the engagement portion of the preform.

The upper retaining means of the handle may be interconnected with the engagement portion of the preform either prior to or after closing the blow mould. Preferably, the handle and preform are disposed within the open blow mould so that the upper retaining means of the handle is adjacent to but not interconnected with the engagement portion of the preform. The blow mould is thereafter closed and the preform pushed down so to effect engagement of the upper retaining means within the moulded engagement portion. Preferably the blow mould is shaped so to allow the preform to be moved downwardly from its original position within the blow mould by a distance of between about 1 to 4 mm so to enable interconnection of the preform with the handle. Conveniently, the preform is pushed down by the blow nozzle intended for use in introducing the high pressure gas into the preform to cause stretch blow moulding.

Preferably the handle and the preform can be positioned within the blow mould substantially simultaneously. In a most preferred embodiment the handle and preform are positioned in the mould by a single transfer arm which holds them both but where the handle and preform are not mutually engaged with each other. The handle may also be inserted into the blow mould marginally earlier or later than the preform and the side wall of the preform and the top of the handle may be respectively shaped so that the preform may slide across the top of the handle when being positioned adjacent to the handle in the blow mould.

Preferably both the handle and preform are transferred into the blow mould in planes which are substantially parallel.

The upper retaining means and the moulded engagement portion may be of various shapes and configurations. Whatever the configuration, the engagement portion on the preform should resist vertical (upwards) or horizontal detachment of the upper retaining means once interconnected;

Preferably, the upper retaining means of the handle is a lug or protrusion disposed at or adjacent the end of the top of the handle. In such arrangement, the moulded engagement portion of the preform is preferably in the form of a flange located beneath a neck finish on the preform, the flange including a depending lip so to provide a downwardly facing groove into which the lug or protrusion at the end of the handle may be retained. Alternatively, the flange may include an aperture into which the lug may be inserted.

Some preforms used on the commercial stretch blow moulding of containers include a flange beneath the container neck finish. This flange (often referred to as the "support ledge") has many purposes including the mechanised transfer of the preform to and from a blow mould and the support of the preform within the blow mould during the introduction of high pressure gas to blow mould the container.

Alternative arrangements of an appropriately shaped retaining means on the handle and a co-operating engagement portion on the preform will be self evident to persons skilled in the art. For example, it is possible to reverse the arrangements described above so that a downwardly facing lug is provided on the preform and an aperture or groove formed within an upper portion of the handle.

Preferably, the upper retaining means of the plastic handle extends from a curved support surface shaped to follow the geometry of the preform immediately beneath the moulded engagement portion. Such a support surface assists in the positioning and location of the upper retaining means for proper engagement with the moulded engagement portion of the preform. Where a support surface is provided its inner diameter should match the outside diameter of the preform. The arc length of the support ring may vary but it is found that it is easier to insert the handle into conventional blow moulding tools when the arc is relatively short.

In the embodiment of the invention where the handle includes a support surface which follows the geometry of the preform, it is particularly preferred that the handle also include a recessed portion adjacent to the support surface which comprises one or more ribs. In such arrangement, when the preform is blown, the portion of the preform immediately adjacent the support surface will expand into the recessed portion but less so in those areas comprising ribbing. As a consequence, once the bottle is blown the ribs in the recessed portion will be located within small indentations on the container and the ribs and indentations will thus co-operate to resist rotational movement of the handle.

The lower retaining means of the handle is preferably a lug or protrusion extending from the lower end of the handle. It should be shaped so that on blow moulding of the preform expansion of the side wall will capture and secure the lug within the formed body of the container. It may be of various geometrical shapes. Most preferably a lug which incorporates a hook or other extension is utilised so to encourage secure engagement with the body of the container.

The handle may be of any suitable configuration. In one embodiment of the invention, the container formed is blow moulded so to include a recess on one side suitable for accommodating the handle. Preferably, this recess includes a ledge onto which the bottom part of the handle may rest. In this configuration, it is preferred that the handle be generally "C" shaped in configuration with the upper and lower retaining means being at opposite ends. In a particularly preferred embodiment, the cross section of the handle is "U" shaped so to include terminal flanges and a connecting web. It is preferred that the terminal flanges face downwardly at the lower end of the handle so that a hollow is formed under the connecting web. In this embodiment, the lower retaining means may be a lug extending from the web. When configured in this way, the blow moulding of the preform in the vicinity of the lug forms a container side wall which fills the hollow formed by the flanges underneath the connecting web and thus securely retains the lug in position.

The handle may also include reinforcing ribs. In the embodiment described above in which the handle has terminal flanges extending from a web so to create a hollow on the underside of the handle it is preferred to strengthen the terminal flanges with ribbing as this area is exposed to high forces exerted by the expanding side wall of the preform during the blow moulding process. Preferably, the handle is formed by injection moulding. It is not necessary that it be made from the same plastics material as the bottle and it may be formed from a plastic such as high density polyethylene, polypropylene, PET, recycled PET, glass reinforced PET and glass reinforced high density polyethylene. The handle could also be made from a metal such as aluminium. The bottle and the handle can be made from the same material and this is preferably PET or recycled PET. This would enhance recycling of the bottle.

In accordance with a further aspect of the present invention there is provided a preform suitable for use in the method hereinbefore described. In particular, such a preform includes a base, an elongate side wall portion and a neck; the said neck including a preformed finish and beneath said finish an outwardly extending flange; said flange including a moulded engagement portion adapted to engage with either an aperture or lug on a handle. Preferably, the engagement portion is in the form of a lip depending from the outer edge of the flange. The preform may be made from any stretch blow mouldable polymer. Preferably, it is formed from a PET homopolymer or copolymer (whether virgin or regrind), or a multilayer structure which may include layers consisting of one or more of PET, PEN, EVOH or other polymers used in multilayer technology.

In accordance with a further embodiment of the invention, there is provided a handled plastic container, said container comprising a blow moulded plastic bottle and a separate handle interconnected thereto wherein said handle comprises upper retaining means and lower retaining means and said bottle includes a moulded engagement portion which is interconnected with the upper retaining means of the handle and wherein the lower retaining means of the handle is secured and integrated into the side wall of the container.

In yet another aspect of the invention there is provided a handled plastic container, said container comprising a blow moulded plastic bottle and a separate handle having a free end and interconnected to said bottle at another end by upper retaining means, said upper retaining means including a lug or protrusion, and the bottle including a neck finish having an engagement portion co-operable with said lug or protrusion connecting said upper retaining means with said bottle.

BRIEF DESCRIPTION OF THE FIGURES

Preferred embodiments of the invention are hereafter described with reference to the following drawings in which.

DETAILED DESCRIPTION

Figures 1, 2A:
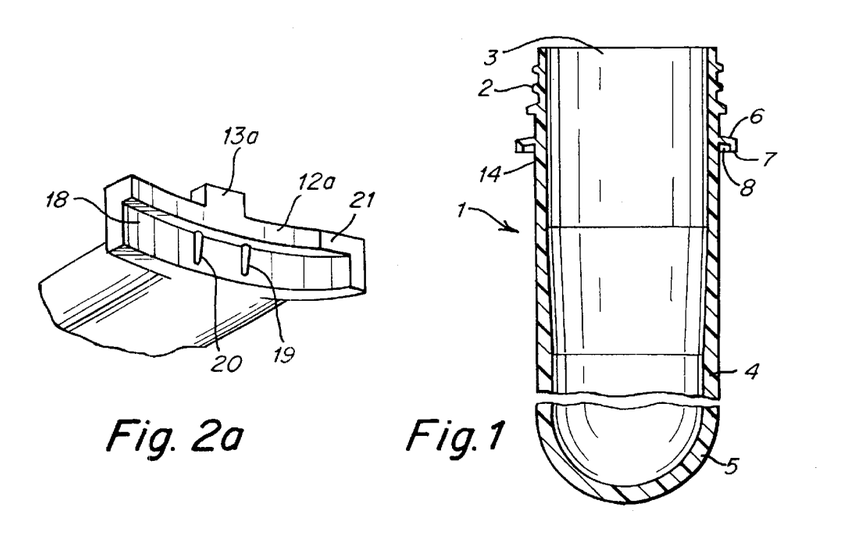
FIG. 1 is a fragmentary cross sectional representation of a preform used in the invention.
FIG. 2a is an enlarged perspective view of the area marked Ia in FIG. 2.

In FIG. 1 there is shown a preform generally designated by the numeral 1. It comprises a screw thread finish 2, an outlet opening 3, elongated side wall portion 4, a base 5 and a support ledge 6. It will be appreciated that the screw thread finish may be substituted by any other preformed finish known in the art. For example to accept a "clip-on" cap or an other suitable closure.

The support ledge 6 includes a lip 7 which depends from the edge of flange 6 so to form a downwardly facing peripheral groove 8. The groove 8 and lip 7 together form the required engagement portion necessary in the present invention. The preform shown in FIG. 1 is preferably injection moulded and preferably formed from PET or recycled PET. If the preform is being formed using regrind material, it is preferable to use a three or five multi layer preform which includes one or more regrind central layers with virgin material on either side as are known in the art. The configuration and composition of such multilayer preforms . . . . are well known to those skilled in the art.

Figure 2:
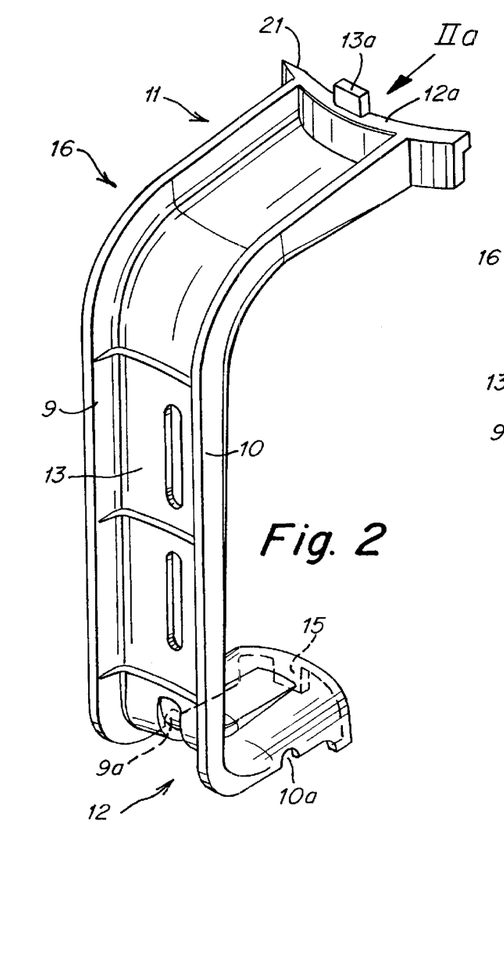
FIG. 2 is a perspective view of a handle suitable for use with the preform shown in FIG. 1.

In FIGS. 2 and 2a, there is shown a first embodiment of a handle 16 suitable for use with the preform shown in FIG. 1 to form a handled container. The handle has upstanding flanges 9 and 10 which extend from the top of the handle 11 to tho bottom of the handle 12. The flanges are interconnected by a web 13 which is slightly concave in profile. Flanges 9 and 10 are provided with indentations 9a and 10a on either side of the handle towards the lower end. At the upper end 11, there is provided a curved support surface 12a and a lug 13a. Lug 13a is shaped so that it may be seated behind lip 7 in groove 8 of the preform shown in FIG. 1. The support surface 12a has a radius of curvature the same as that as the outer wall 4 of the preform 1 in the portion 14 located immediately beneath flange 6. At the lower end 12 of the handle, there is provided lower retaining means being lug 15.

Figure 3:
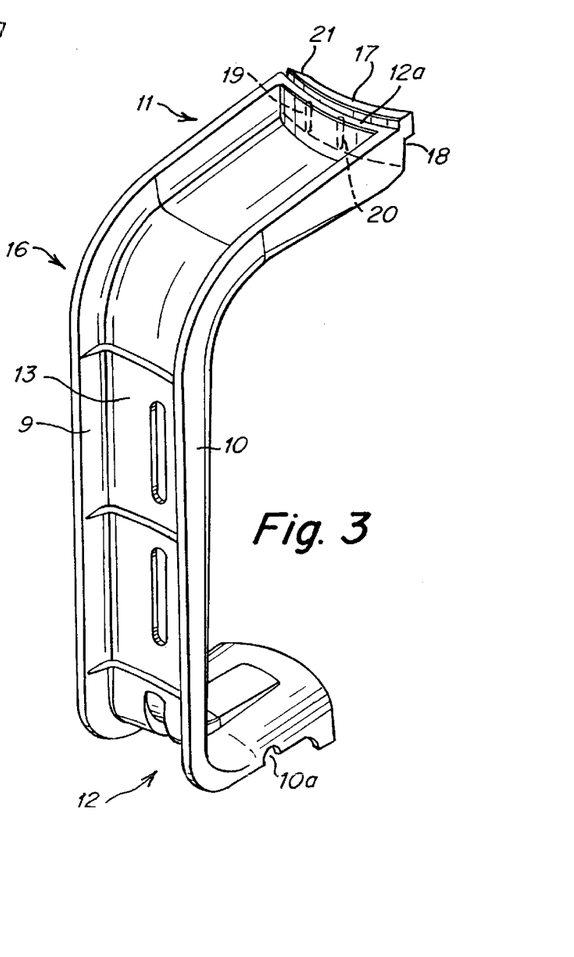
FIG. 3 is an alternative handle design also suitable for use with the preform shown in FIG. 1.

In FIG. 3, there is shown an alternative handle 16. Handle 16 is substantially the same as the handle shown in FIG. 2 except at the upper end where the handle includes a raised engagement portion 17 which extends from the top of the support surface 12a along its full length. A recessed area 18 is provided in the lower portion of the support surface 12a and the recessed portion comprises two ribs 19 and 20. The handle has a smooth profile 21 on one side so to allow both the preform 1 and the handle to move together into the blow mould in parallel planes.

Figure 8:
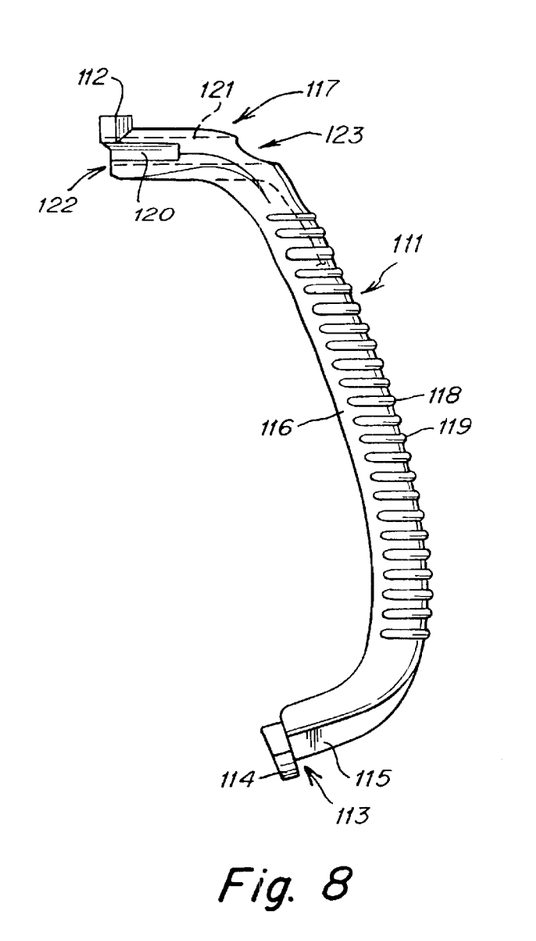
FIG. 8 is a side elevation of an alternative handle suitable for use in the present invention.
Figure 9:
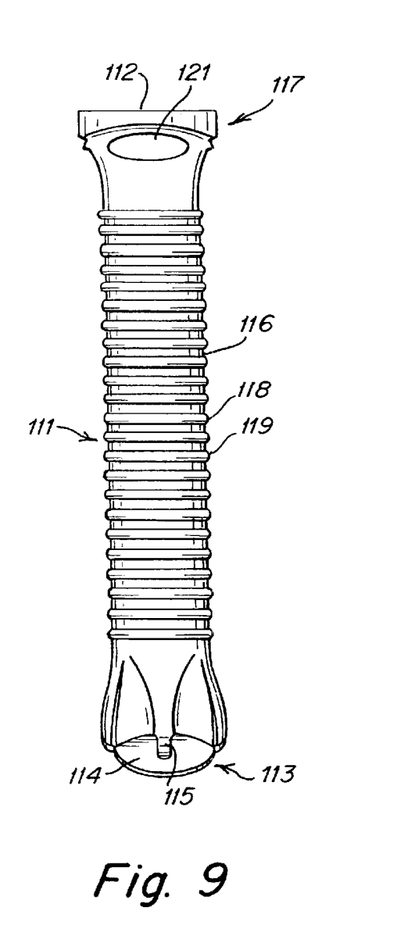
FIG. 9 is a front elevation of the handle shown in FIG. 8 as shown from the side which faces away from the bottle to which it may attach.

In FIGS. 8 and 9, handle 111 has a protrusion 112 in the upper retaining end 117 of the handle and a lower retaining end 113 which includes a projection 114 and a rib 115 which are integrated into the side wall of the bottle when blown. Protrusion 112 is adapted to locate in peripheral groove 8 behind lip 7. Handle 111 has a main body 116 which extends between the upper retaining end 117 and the lower retaining end 113 and includes a plurality of ribs 118, 119 to facilitate easy handling by the user and to aid grip. The upper retaining end 117 includes recessed portions 120 on either side and an opening 121 which extends all the way through upper retaining end 117 from a support surface 122 to the rear part 123 of the upper retaining end 117.

Figure 4:
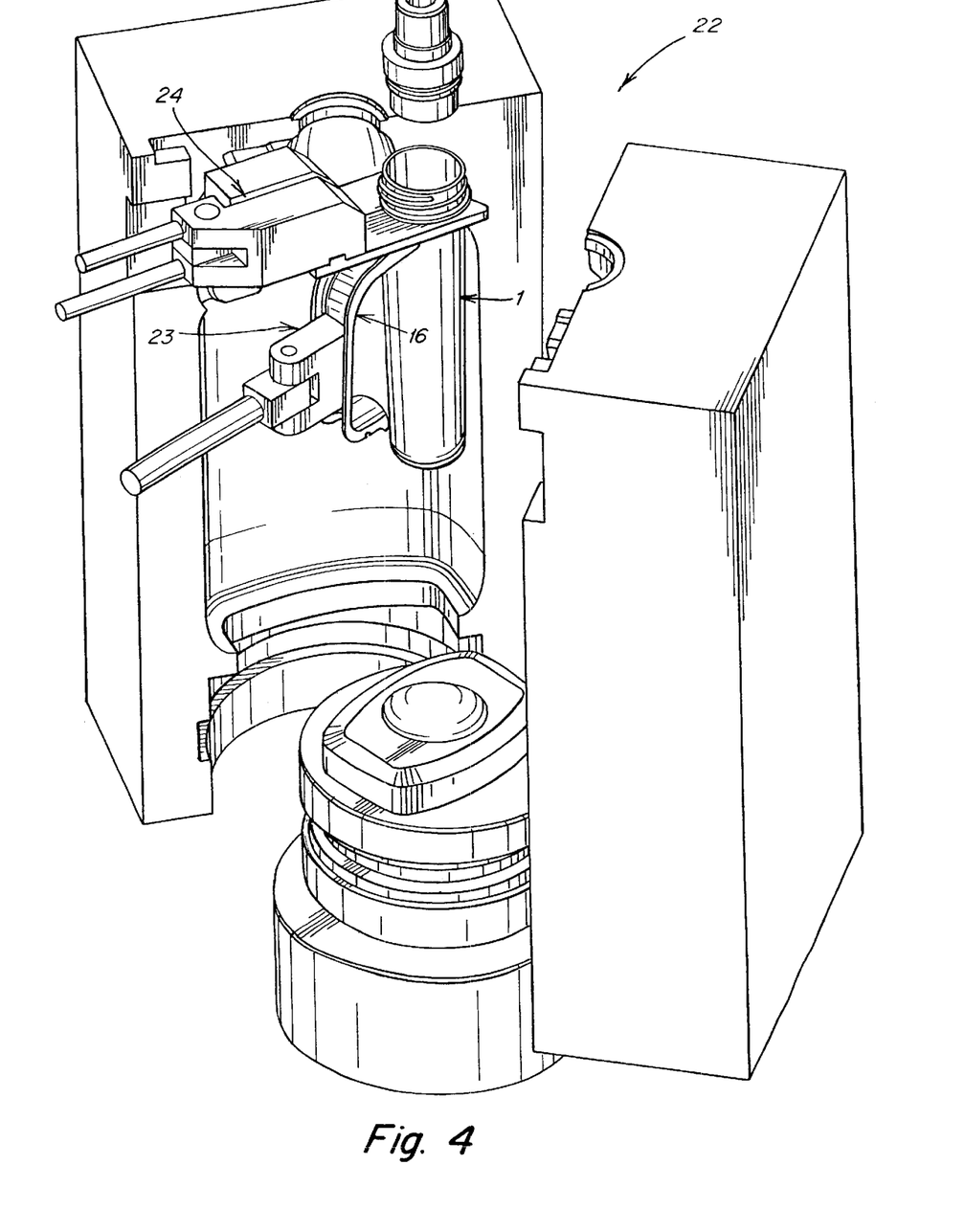
FIG. 4 is a perspective view of the handle and preform shown in FIGS. 1 and 3 being placed within an open blow mould.

The bottle of the invention is made in accordance with the following steps. First, the preformed plastic handle 16 is transferred to an open blow mould 22 by a transfer arm 23 as shown in FIG. 4. The preform shown in FIG. 1 is preheated in accordance with standard methodology. It is thereafter transferred to the blow mould 22 by transfer arm 24. The preform 1 and handle 16 are transferred into the blow mould substantially simultaneously. The handle fits within cavity 25 and the preform within cavity 26.

Figure 5:
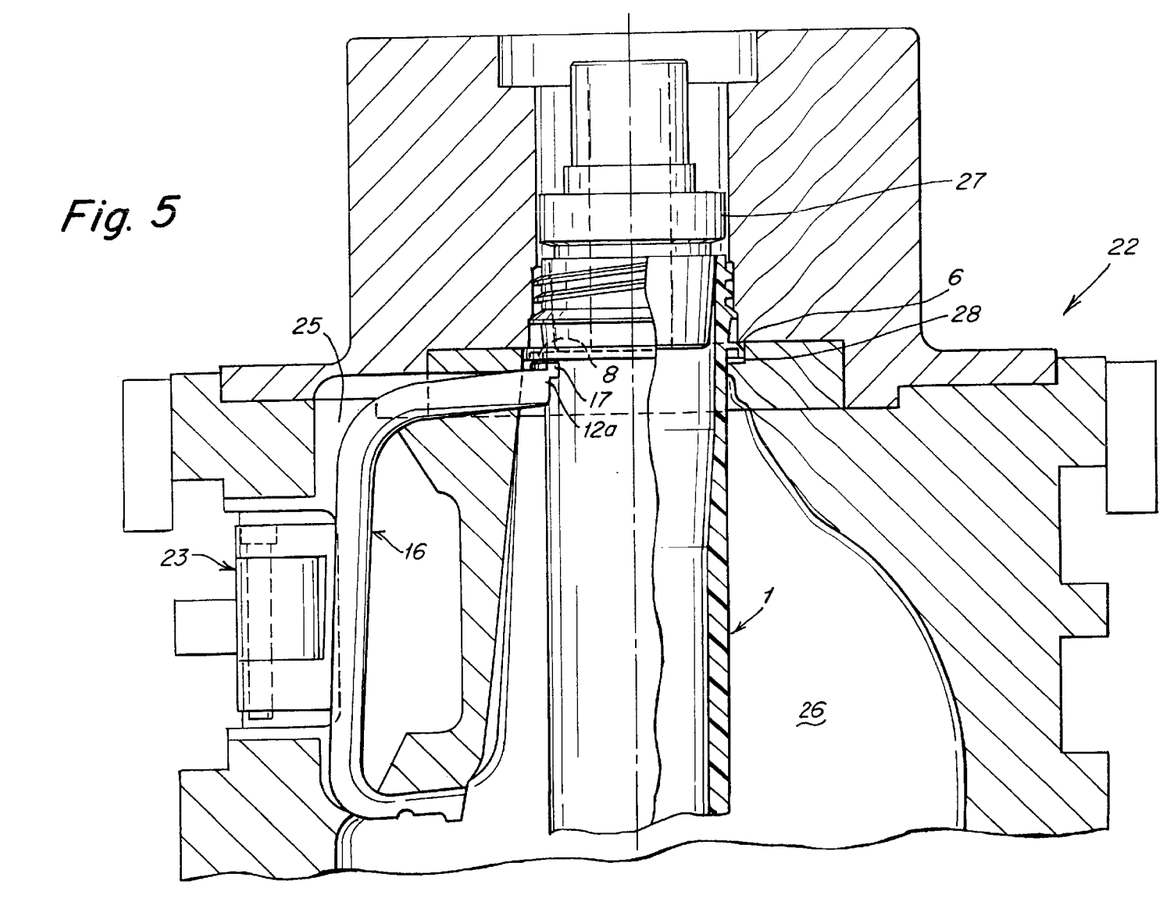
FIG. 5 is a cross sectional view of the blow mould shown in FIG. 4 with the preform and handle as initially positioned therein.
Figure 6:
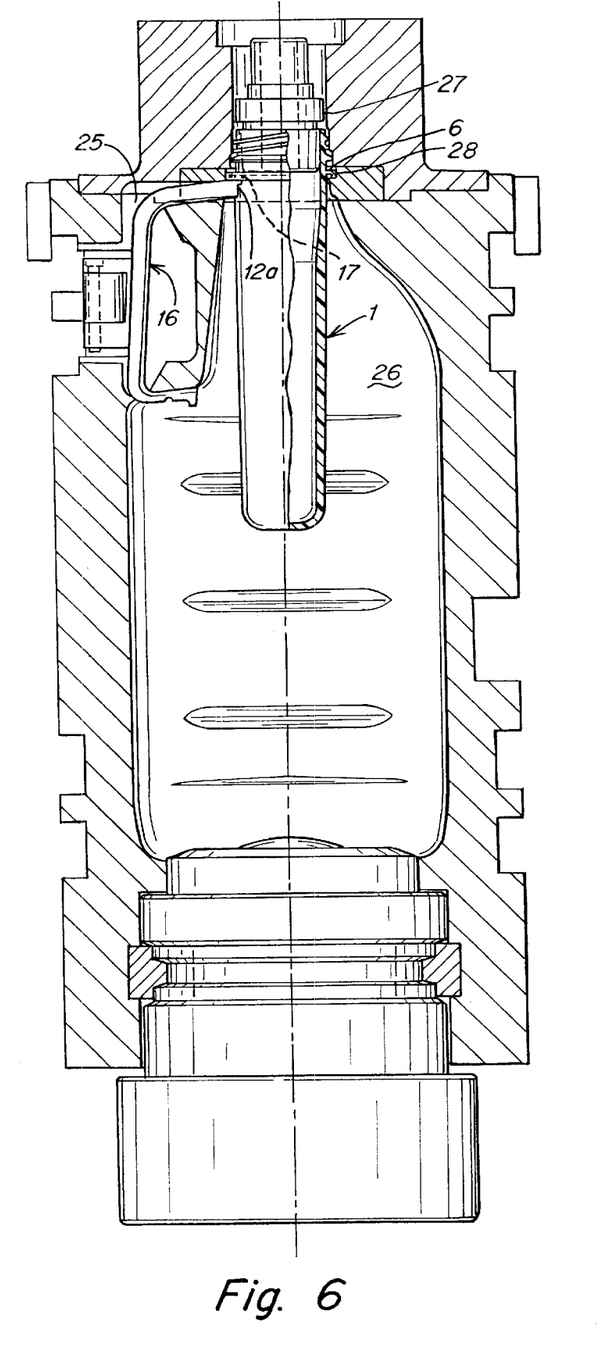
FIG. 6 is a cross sectional view of the blow mould handle and preform once the blow mould has been closed and the top part of the handle has been interconnected with the preform.

In another embodiment not shown a single transfer arm may transfer both the preform and the handle into the blow mould. In this embodiment, which is particularly suited to the type of handle shown in FIGS. 8 and 9, there may be provided a pin on the transfer arm which locates in opening 121 and jaws which press into recessed portions 120. The pin and jaws are located in a region below the part of the transfer arm which holds preform 1. As shown in FIG. 5, preform 1 and handle 16 are located adjacent to one another but are not interconnected. Raised engagement portion 17 is positioned immediately below groove 8. The blow mould halves are thereafter closed and a blow nozzle 27 is moved down on to the preform 1. Upon closing of the mould halves recessed portions in the mould (not shown) may hold the handle and the transfer arm may be retracted. The stroke of the blow nozzle is sufficient to move the preform down so that engagement portion 17 locates within groove 8 so to interconnect the preform and handle. Cavity 26 includes a groove 28 which is deeper than support ledge 6 so to facilitate the downward movement of preform 1. FIG. 6 illustrates preform 1 and handle 16 positioned within the blow mould after interconnection.

Once the blow mould has been closed and the preform and handle interconnected, a gas is then introduced into the preform 1 so to stretch and blow the preform beneath flange 7 into the closed blow mould 21 to form the container. In the blow moulding process, plastic underneath the support surface 12a expands and this pushes the handle insert further up into the groove 8 thereby further securing the handle into position. This restricts updown movement of the handle. The plastic also expands around the sides of the support surface 12a and this restricts the sideways movement of the handle once the container has been blown. The sideways movement is further restricted by ribs 19 and 20 and corresponding indentations not shown in container.

At the lower end 12 of handle 16, lug 15 becomes surrounded by plastic which expands upwardly to fill the recess formed between flanges 9 and 10. Retaining lug 15 surrounded by the plastic resists sideways or horizontal movement and this resistance of movement prevents engagement portion 17 from being levered out of the groove 8.

Figure 7:
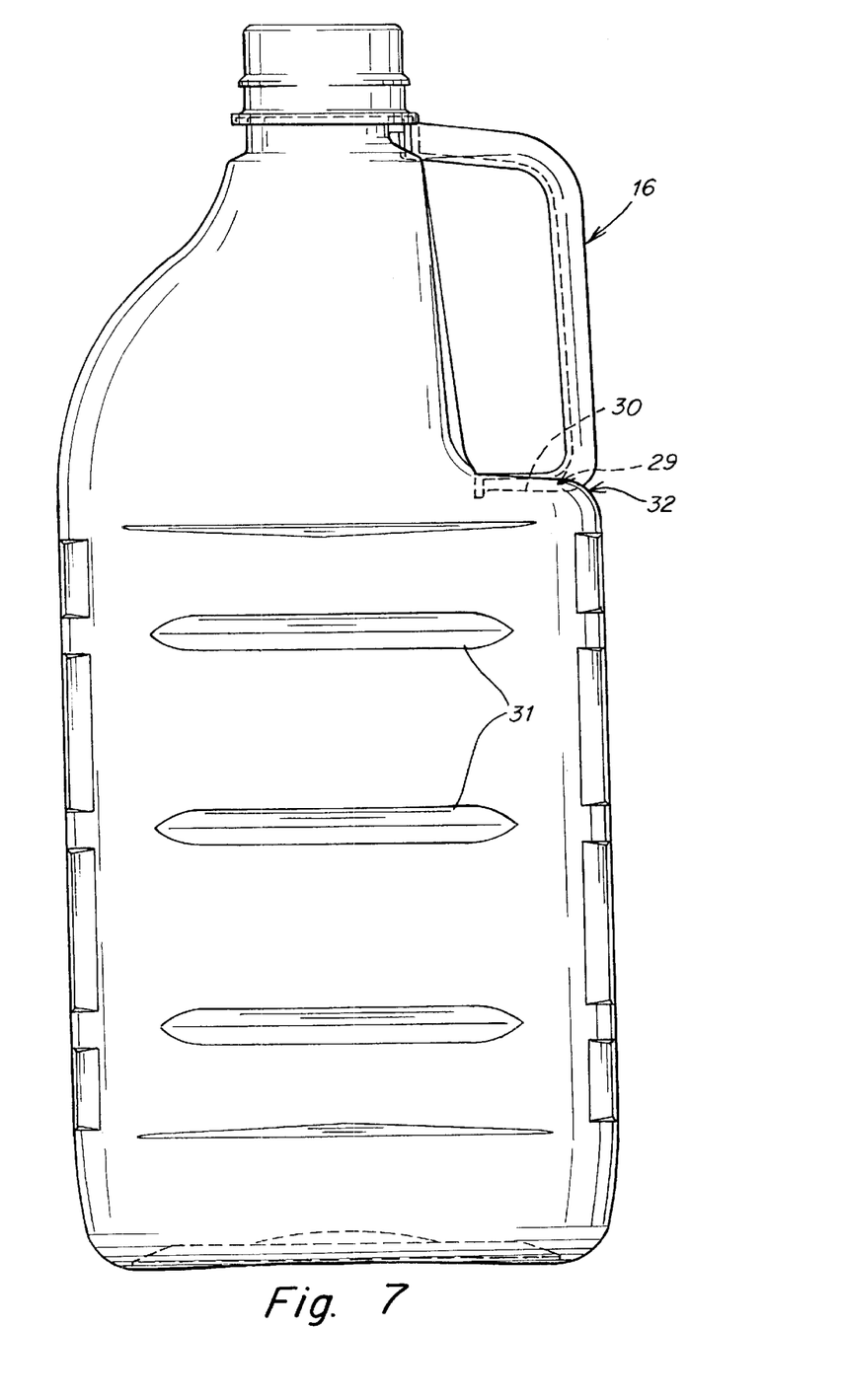
FIG. 7 is a side elevational view of a handled bottle made in accordance with the invention.

The container so formed is shown in FIG. 7. It is noted that the handle 16 is designed so that it fits within the overall width/depth of the bottle. This facilitates easy package and transport of the bottle in that the handle will not interfere with cartons and boxes.

The bottle shown in FIG. 7 has a recess 29 which includes a ledge 30 on which the lower portion of handle 16 sits. The bottle preferably includes side wall ribbing 31 to strengthen the walls against crushing.

In use, the bottle of the present invention has significant advantages over prior art arrangements. The dimensions of handle permit easy access for the user's hand. It is strengthened due to the "U" shaped cross section and this cross section also facilitates easy use of the handle as the groove thereformed in the top of the handle enables the user to place his thumb in the concave section enabling easy stabilisation of the bottle as it is lifted and poured.

Once liquid has been removed from the container, the container may be crushed at point 32 shown in FIG. 7. This facilities easy removal of the handle from the bottle as a whole. This easy removal is useful in recycling. If the handle is formed from a different material to the bottle then contamination can be minimised and even if the handle is made from the same material as the bottle, then removal may be desirable as different processing is often required in recycling thicker and harder materials as would preferably be used in a handle as compared with the thin and flexible blown container.

Thus, the present invention provides a container which is easy to use, simple to dismantle after emptying for recycling and which can be readily manufactured from a preform on blow mould apparatus at a relatively rapid rate.

It will be appreciated that various modifications and additions may be made to the preform, the handle and the bottle as hereinbefore described without departing from the spirit and ambit of the present invention.

What is claimed is:

1. A handed plastic container, said container comprising a blow molded plastic bottle and a separate handle interconnected thereto wherein the handle includes upper retaining means and lower retaining means, said upper retaining means including a lug or protrusion, and the bottle including a neck finish having an engagement portion positionable above the upper retaining means and co-operable with said lug or protrusion for connecting said upper retaining means with said bottle, wherein the engagement portion comprises a flange located on the neck finish which flange includes at least one of a groove and aperture into which the lug or protrusion locates and wherein the lower retaining means is integrated with a portion of a sidewall of the bottle.

2. The handled plastic container of claim 1, wherein the handle includes in the region of the upper retaining means a curved support surface having therein a recessed portion into which the blown bottle at least partially projects.

3. The handled plastic container of claim 2, wherein the handle includes in the region of the upper retaining means at least one rib which at least partially projects into the blown bottle so as to reduce lateral movement of the handle relative to the bottle.

4. The handled plastic container of claim 1, wherein the handle includes in the region of the upper retaining means a curved support surface having a top surface, the lug or protrusion extending upwardly from the top surface.

5. The handled plastic container of claim 1, wherein a blown portion of the bottle further secures the engagement portion with the lug or protrusion.

6. The handled plastic container of claim 1, wherein the lower retaining means includes a lower handle portion engaged with a portion of the blown bottle.

7. The handled plastic container of claim 6, wherein the lower retaining means includes at least one rib on the handle which at least partially projects into the sidewall so as to reduce lateral movement of the handle relative to the blown bottle.

8. The handled plastic container of claim 1, wherein the plastic bottle is made from polyethylene terephthalate (PET).

9. The handled plastic container of claim 1, wherein both the handle and bottle are made from polyethylene terephthalate.

10. The handled plastic container of claim 1, wherein the handle is formed from a plastic selected from the group consisting of high density polyethylene, polypropylene, polyethylene terephthalate, recycled polyethylene terephthalate, glass reinforced polyethylene terephthalate, and glass reinforced high density polyethylene.

11. The handled plastic container of claim 1, wherein the handle has a generally C-shaped configuration with the upper and lower retaining means at opposite ends.

12. The handled plastic container of claim 1, wherein the engagement portion comprises a groove into which the lug or protrusion locates.

13. The handled plastic container of claim 1, wherein the engagement portion comprises an aperture into which the lug or protrusion locates.

14. The handled plastic container of claim 1, wherein the lower retaining means includes at least one rib on the handle which at least partially projects into the sidewall so as to reduce lateral movement of the handle relative to the blown bottle.

* * * * *

UNITED STATES PATENT AND TRADEMARK OFFICE
CERTIFICATE OF CORRECTION

PATENT NO. : 6,338,415
DATED : January 15, 2002
INVENTOR(S) : Rolf Grob

Page 1 of 1

It is certified that error appears in the above-identified patent and that said Letters Patent is hereby corrected as shown below:

<u>Column 8,</u>
Line 2, delete "handed" and insert -- handled --

Signed and Sealed this

Seventh Day of May, 2002

Attest:

*Attesting Officer*

JAMES E. ROGAN
*Director of the United States Patent and Trademark Office*